United States Patent [19]

Donle

[11] Patent Number: 4,926,620
[45] Date of Patent: May 22, 1990

[54] CLEANING GAS TURBINE INLET AIR

[75] Inventor: David W. Donle, Lake Jackson, Tex.

[73] Assignee: The Dow Chemical Company, Midland, Mich.

[21] Appl. No.: 217,006

[22] Filed: Jul. 8, 1988

[51] Int. Cl.$^5$ .............................................. B01D 47/06
[52] U.S. Cl. ......................................... 55/89; 55/90; 55/94; 55/97
[58] Field of Search ............... 55/18, 89, 93, 94, 97, 55/185, 228, 229, 240, 257.1, 257.2, 258–260

[56] References Cited

U.S. PATENT DOCUMENTS

| | | | |
|---|---|---|---|
| 1,222,541 | 4/1917 | Donham | 55/94 |
| 2,207,774 | 7/1940 | Barthelemy | 55/89 X |
| 2,217,130 | 10/1940 | Niehart | 55/228 X |
| 3,465,504 | 9/1969 | Oropeza et al. | 55/259 X |
| 3,559,379 | 2/1971 | Lambert | 55/259 X |
| 3,733,778 | 5/1973 | Hungate et al. | 55/94 X |
| 3,785,127 | 1/1974 | Mare | 55/257.2 X |
| 3,807,145 | 4/1974 | Engalitcheff, Jr. et al. | 55/228 X |
| 4,334,897 | 6/1982 | Brady et al. | 55/257.2 |
| 4,374,813 | 2/1983 | Chen et al. | 55/89 X |

FOREIGN PATENT DOCUMENTS

| | | | |
|---|---|---|---|
| 342292 | 1/1931 | United Kingdom | 55/229 |
| 2087258 | 5/1982 | United Kingdom | 55/228 |

OTHER PUBLICATIONS

"Pneumafil High Velocity Air Washer", Pneumafil Corporation, pp. 1–4.

Peterson, John C., "Practical Air Washer Treatment in Synthetic Fiber Manufacturing Plants," Nov. 2–4, 1987, 48th International Water Conference, Pittsburgh, Pa.

Primary Examiner—Robert Spitzer

[57] ABSTRACT

A process and apparatus for cleaning contaminants from inlet air passing to a gas turbine, including contacting the air with a stream of water at a rate and spray pattern sufficient to reduce contaminants present in the air. The water scrubbing action of the process and apparatus removes gaseous and solid contaminants which can cause corrosion and erosion of turbine parts and which can cause buildup of solid materials in the turbine.

11 Claims, 1 Drawing Sheet

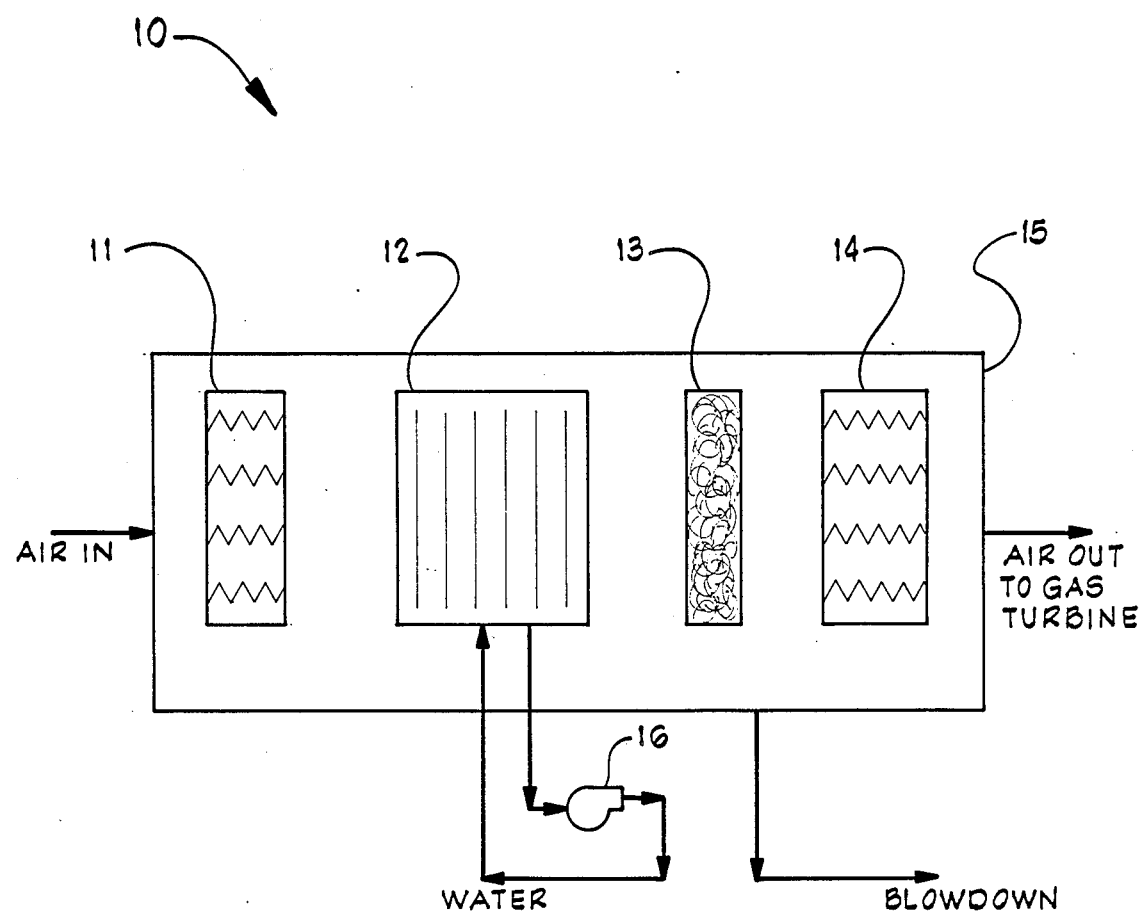

CLEANING GAS TURBINE INLET AIR

BACKGROUND OF THE INVENTION

This invention relates to a process and apparatus for cleaning air passing to the inlet of a gas turbine, and more particularly, this invention relates to a process and apparatus for reducing contaminants present in air passing to the inlet of a gas turbine.

The operation of a gas turbine is well known. In the initial phase of a gas turbine's cycle, an air compressor stage consumes approximately 60 percent of the work done by the power turbine. As such, the efficiency of the compression stage has a large affect on the efficiency of the whole cycle. To maintain peak efficiency, the compressor would have to be kept extremely clean and the blades would have to maintain their original design profile and surface smoothness. However, with these compressors pulling in ambient air laden with particulate material and in some environments cannot be maintained. The compressor blades are eroded by the larger particles. Smaller particles stick to the blades changing the shape and smoothness of the blades. This is called "fouling." Both the small particles and corrosive volatiles work to corrode the blade surface. Gas turbines, therefore, require "clean" air to prevent fouling, corrosion, and erosion of the gas turbine internal components such as the compressor blades.

The "state-of-the-art" method for cleaning inlet air to gas turbines is to use a combination of filters for removing particulate in the air. However, air filters, alone, have not been successful in eliminating the fouling, erosion, and corrosion damage to the compressor. The result is loss of efficiency and damage to expensive compressor blading. The air contaminants in either particulate or gaseous form penetrate even the best filter system on the market, and enter the a compressor section of a gas turbine engine. The particulates which make their way to the compressor will erode the compressor blades, or stick to the blades which cause fouling and often corrosion and pitting. The corrosion can weaken a blade to the failure point or, as a minimum, degrade airfoil performance. In addition, both solid and gaseous contaminants which make it through the compressor will enter the turbine section, causing a buildup of material which degrades the machine performance and causes hot corrosion of the hot end parts. The costs to a gas turbine operator from degraded performance and worn and/or corroded parts replacement due to contaminated inlet air can exceed a million dollars per year per turbine.

It is, therefore, desirous to install an apparatus for cleaning the inlet air directly down stream or particulate filters used in conjunction with gas turbines. More particularly, it is desired to provide an air scrubber which removes gaseous and solid contaminants from air passing to a gas turbine which can cause corrosion of turbine parts. It is further desired to provide an apparatus for scrubbing air and which reduces buildup of solid materials in the turbine.

It is further desired to provide an air cleaning apparatus which has an intense air scrubbing action not present in any evaporative coolers in gas turbine inlet systems. In addition, it is desired to provide an air cleaning apparatus which will remove particles and gaseous contaminants which get through the dry filter systems on the market today. It is further desired to provide an air cleaning system which will have a relatively low operating cost.

SUMMARY OF THE INVENTION

One aspect of the present invention is directed to a process for cleaning inlet air to a gas turbine including contacting the air passing to the inlet of a gas turbine with a stream of water at a rate and spray pattern sufficient to reduce the contaminants present in the air.

Another aspect of the present invention is an apparatus for cleaning inlet air to a gas turbine including a means for contacting the air to reduce the contaminants present in the air.

BRIEF DESCRIPTION OF THE DRAWING

The drawing is a top schematic view showing an air scrubber apparatus of the present invention.

DETAILED DESCRIPTION OF THE PREFERRED EMBODIMENTS

In its broadest scope, the present invention is directed to a process and apparatus for cleaning air entering the inlet of a gas turbine. One objective of the present invention is to remove and reduce the contaminant level in air passing to the inlet of a gas turbine by contacting the air with water stream or streams to carry out a "scrubbing" action, i.e., removal of contaminants. "Contaminants" herein means particles and/or volatiles. The volatiles may be, for example, corrosive gases.

In a preferred embodiment of the present invention and with reference to the drawing, there is shown an air cleaning apparatus, generally indicated by numeral 10. The air cleaning apparatus 10, herein referred to as the air scrubber 10, comprises a first section of straightening blades 11, a second section of spray streams of water 12, a third section of a coalescing media 13, and a fourth section of moisture separators 14, all sections preferably enclosed in a housing 15.

The air scrubber 10 enhances the function of conventional inlet air filters which, if desired, can be installed prior to or after the air scrubber 10 to aid further in the removal of air contaminants from the air flow to the inlet of a gas turbine. Advantageously, the air scrubber 10 provides a water scrubbing stage, not present in conventional filters. If, for example, the air scrubber 10 is placed downstream of the filters, it can be used to wash the air of particles which pass through the filters or which shed from the filter media itself. The air scrubber 10 further washes the air of corrosive volatiles which will not be picked up or captured by a conventional particle filter.

In carrying out the one embodiment of the process of the present invention, an air flow containing particulate contaminants and volatile contaminants therein passes through the straightening blades 11 to assure a uniform flow velocity. A uniform flow velocity is required to assure maximum water scrubbing in the water scrubbing section 12 next described. The average velocity of the air through the blades 11 may be, for example, in the range of from about 800 feet per minute to about 1500 feet per minute. However, the velocity at any one point measured downstream of the blades should be within 10% of the average velocity of the air passing through the blades. Straightening blades 11 for this application are commercially available from any number of vendors in the industrial air humidification industry such as Carrier Corp. of Syracuse, N.Y.

After the contaminated air flow passes through the straightening blades 11, the contaminated air flow is intimately contacted with water sufficient for the water to dissolve contaminants therein, absorb volatiles therein, and/or catch particles therein. The air flow is contacted with water by passing the air flow through one or more scrubbing sections 12. The scrubbing sections 12 are, preferably, made up of one or more water streams of finely atomized spray streams of water formed by fine atomizing spray nozzles. More preferably, the atomized spray streams include atomized spray streams of water defining a plurality of flat walls of water made up of fine particles of water. The walls of water are formed, for example, by a system of nozzles which are located in pairs with each nozzle in a pair diametrically opposed, i.e., facing the other nozzle of that pair in mirror-like fashion, such that the two water streams impact head on. The result is a fanning effect in which a flat wall of finely atomized water is created. Nozzles which are used to form the water walls and which may be used in the present invention are manufactured by and available from, for example, Pneumafil Corporation of Charlotte, N.C. The spray density of the water in this stage is between about 1 and about 30 gallons per minute per square foot of cross-section (gpm/ft$^2$). At the required nozzle pressure of between about 10 psig and about 50 psig, the required horsepower for pumping is between about 0.1 and about 1.0 hp/ft$^2$.

The water walls scrub the air as well as evaporative cool the air. The contaminants present in the air are removed or extracted from the air by the water. For example, contaminants may be dissolved in the water, volatiles may be absorbed into the water, and/or particle contaminants may be caught by the water to reduce the contaminants from the air. The water containing contaminants falls to the bottom of the air scrubber 10 into a reservoir. Substantially all or a portion of the water may be recirculated through this stage with a circulating pump 16. The chemical components in the water may be carefully monitored with, for example, conventional conductivity probes. An automatic blowdown is carried out with valves according to a signal from the conductivity probes to assure optimum water chemistry. It is preferred that the chemistry of this water be maintained such that no contaminants will be reabsorbed into the air or carried over into the turbine to cause fouling. It is contemplated that the entrainment of organics and suspended solids from the air into the water will require additional blowdown based on water testing. In addition, it is contemplated that biological fouling may occur in the water requiring treatment of the water to remove or reduce such fouling, for example, by ozone or ultraviolet treatment of the water.

After the air flow is passed through the scrubbing section 12, the air flow passes through a coalescing stage 13 in which fine water droplets in the air are agglomerated into larger particles to facilitate higher efficiency removal in the separator stage 14 next described. Coalescing pads are commercially available from any number of vendors in the air filtration industry such as Farr Company, Los Angeles, Calif.

From the coalescing section 13, the air flow continues through a fourth section comprising blade moisture separators 14. The moisture separators 14 are designed to remove free moisture from the air so that droplets present in the air will not be carried into the turbine. The pressure drop in the coalescing section 13 and separating section 14 should be minimized such that the overall pressure drop of the air going through the scrubber 10 does not significantly reduce turbine output, while removing moisture down to a critical particle size of approximately less than 20 microns. Blade type moisture separators are commercially available from any number of vendors in the industrial air humidification industry such as Munters Corp., Ft. Myers, Fla. Generally, the inlet pressure drop of the air going through the scrubber 10 is less than about 2 inches of water and the power loss of the turbine should be less than about 1%.

Depending on the composition and size of contaminants in the incoming air, and the equipment operation, the apparatus of the present invention will reduce the contaminants in the incoming air by about 10% to 100%. These contaminants are counted both upstream and downstream of the apparatus with, for example, conventional sophisticated laser type particle counters accurate down to 0.19 microns. In addition, contaminant removal may be determined by measuring the conductivity of a sample of air which is bubbled through a column of water. Ions typically removed from the air using the apparatus of the present invention include, but are not limited to, chloride, nitrate, sulfate, sodium, ammonium, potassium, magnesium, and calcium.

While the apparatus of the present invention has been described with reference to gas turbines for air contaminant removal, it is contemplated that the apparatus could also be used for furnaces, reactors using air, air stripping separators, and other apparatus wherein contaminant removal from air or gases is desired. In addition, a selected solvent may be substituted for water and used for cleaning air or other gases or for recovering particulate in various process streams.

What is claimed is:

1. A process for removing particulate and volatile contaminants from inlet air passing to a gas turbine comprising contacting the air with a stream of water at a rate sufficient to reduce the contaminants present in the air by passing the air through a spray pattern or a substantially flat wall of finely atomized water formed by at least a pair of opposing spray streams whereby the streams impact each other to fan out creating the wall of water.

2. The process of claim 1 wherein the air is simultaneously cooled and humidified.

3. The process of claim 1 wherein the rate of water is about 1 to about 30 gpm/ft$^2$.

4. The process of claim 1 wherein the spray pattern of the water is perpendicular to the bulk air flow through the unit.

5. The process of claim 1 wherein a major portion of the water is recirculated.

6. The process of claim 1 wherein the contaminants in the spray water are maintained below the level at which carry-over of contaminants into the compressor of the gas turbine may occur.

7. The process of claim 1 wherein the flat wall of water is formed by a plurality of pairs of opposing water jet streams.

8. A process for removing particulate and volatile contaminants from inlet air passing to a gas turbine comprising:
   (a) filtering a stream of air to remove at least a portion of the particulates from the air; and (b) contacting the filtered stream of air with a water stream at a rate sufficient to further reduce the contaminants present in the air by passing the air through a spray pattern of a substantially flat wall of finely atomized water formed by at least a pair of opposing spray streams whereby the streams impact each other to fan out creating the wall of water.

9. A process for removing particulate and volatile contaminants from inlet air passing to a gas turbine comprising:
   (a) contacting a stream of air with a water stream at a rate sufficient to reduce the contaminants present in the air by passing the air through a spray pattern of a substantially flat wall of finely atomized water formed by at least a pair of opposing spray streams whereby the streams impact each other to fan out creating the wall of water; and
   (b) filtering the stream of air to further remove particulates from the air.

10. A process for operating gas turbines comprising:
   a. removing particulate and volatile contaminants from inlet air passing to a gas turbine including contacting the air with a stream of water at a rate sufficient to reduce the contaminants present in the air by passing the air through a spray pattern of a substantially flat wall of finely atomized water formed by at least a pair of opposing spray streams whereby the streams impact each other to fan out creating the wall of water; and
   b. passing said air to the inlet of a gas turbine.

11. In a process of operating a gas turbine including passing air to the inlet of the gas turbine, the improvement which comprises reducing particulate and volatile contaminants present in the air by contacting the air with a water stream at a rate sufficient to reduce the contaminants present in the air by passing the air through a spray pattern of a substantially flat wall of finely atomized water formed by at least a pair of opposing spray streams whereby the streams impact each other to fan out creating the wall of water.

* * * * *